(12) United States Patent
Dalsgaard et al.

(10) Patent No.: US 12,262,305 B2
(45) Date of Patent: Mar. 25, 2025

(54) METHODS, DEVICES AND COMPUTER READABLE MEDIUM FOR DETECTING CELLS IN SCENARIOS OF CARRIER AGGREGATION

(71) Applicant: Nokia Technologies OY, Espoo (FI)

(72) Inventors: Lars Dalsgaard, Oulu (FI); Yueji Chen, Zhejiang (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 865 days.

(21) Appl. No.: 17/269,062

(22) PCT Filed: Aug. 19, 2018

(86) PCT No.: PCT/CN2018/101223
§ 371 (c)(1),
(2) Date: Feb. 17, 2021

(87) PCT Pub. No.: WO2020/037448
PCT Pub. Date: Feb. 27, 2020

(65) Prior Publication Data
US 2021/0250851 A1     Aug. 12, 2021

(51) Int. Cl.
*H04W 48/16*     (2009.01)
*H04L 5/00*     (2006.01)
*H04W 76/15*     (2018.01)

(52) U.S. Cl.
CPC .......... *H04W 48/16* (2013.01); *H04L 5/0048* (2013.01); *H04W 76/15* (2018.02)

(58) Field of Classification Search
CPC ..... H04W 48/16; H04W 76/15; H04W 36/08; H04W 16/28; H04W 24/10;
(Continued)

(56) References Cited

U.S. PATENT DOCUMENTS

2015/0188678 A1\* 7/2015 Wu ........................... G01S 1/14
                                                            455/456.6
2017/0332359 A1   11/2017 Tsai et al.
(Continued)

FOREIGN PATENT DOCUMENTS

CN     105101321 A     11/2015
CN     105103631 A     11/2015
(Continued)

OTHER PUBLICATIONS

WO 2017/022902 A1 (Year: 2017).\*
(Continued)

*Primary Examiner* — Rushil P. Sampat
(74) *Attorney, Agent, or Firm* — Lippes Mathias LLP

(57) ABSTRACT

Embodiments of the disclosure provide a method, device and computer readable medium for detecting cells in scenarios of carrier aggregations. According to embodiments of the present disclosure, if the terminal device receives information indicating to connect to a different cell from the currently connecting cell, the terminal device detects the different cell in a spatial direction of the beam on which the information is received. In this way, a significant reduction in terminal device search and measurement effort is achieve, which leads to significant reduction in the latency.

20 Claims, 4 Drawing Sheets

(58) Field of Classification Search
CPC ....... H04W 36/0079; H04W 36/00835; H04W 36/0085; H04W 36/0094; H04W 36/30; H04W 76/18; H04W 76/19; H04W 76/27; H04W 36/0058; H04W 36/00837; H04L 5/0048; H04B 17/309; H04B 7/0695; H04B 7/088

See application file for complete search history.

(56) References Cited

U.S. PATENT DOCUMENTS

| | | | | |
|---|---|---|---|---|
| 2018/0139673 | A1* | 5/2018 | Peisa | H04W 72/541 |
| 2018/0359790 | A1* | 12/2018 | Ingale | H04W 74/08 |
| 2019/0045566 | A1* | 2/2019 | Wu | H04W 76/27 |
| 2019/0132066 | A1* | 5/2019 | Park | H04W 24/10 |
| 2021/0314902 | A1* | 10/2021 | Bi | H04B 7/024 |

FOREIGN PATENT DOCUMENTS

| | | |
|---|---|---|
| CN | 108337065 A | 7/2018 |
| WO | WO 2017/022902 A1 | 2/2017 |

OTHER PUBLICATIONS

Ericsson: "SCell activation for SCell in FR2", R4-1808930 $3^{rd}$ Generation Partnership Project (3GPP), 3GPP TSG RAN WG4, Meeting #AH1807, Montreal Canada; Jul. 2-6, 20018, Jun. 25, 2018 (Jun. 25, 2018), XP051583172, URL:http://www.3gpp.org/ftp/tsg%5Fran/WG4%5FRadio/TSGR4%5FAHs/TSGR4%5FAH%2DI807/Docs/R4%2DI808930%2Ezip [retrieved on Jun. 25, 2018-] * Paragraphs 1 to 3 *.

LG Electronics Inc: "Timing issue in configuring SCell in activated State" R2-1802301 $3^{rd}$ Generation Partnership Project (3GPP), 3GPP TSG-RAN2 Meeting #101 Athens, Greece; Feb. 26-Mar. 2, 2017, Feb. 15, 2018 (Feb. 15, 2018), XP051399460, URL:http://www.3gpp.org/ftp/tsg%5Fran/WG2%5FRL2/TSGR2%5F101/Docs/ [retrieved on Feb. 15, 2018] * Paragraphs 2 and 3 *.

Intel Corporation: "Discussion on NR SCell activation delay requirement", R4-1801833 3RD Generation Partnership Project (3GPP), 3GPP RAN WG4 Meeting #86, Athens, Greece; Feb. 26-Mar. 2, 2018, Feb. 19, 2018 (Feb. 19, 2018), XP051403142, URL:http://www.3gpp.org/ftp/tsg%5Fran/WG4%_5FRadio/TSGR4%5F86/Docs/ [retrieved on Feb. 19, 2018] * the whole document *.

Ericsson: "UE architecture and interruptions" R4-1707102 $3^{rd}$ Generation Partnership Project (3GPP), 3GPP Ran WG4 Meeting #84, Berlin, Germany; Aug. 21-25, 2017, Aug. 20, 2017 (Aug. 20, 2017), XP051320381, URL:http://www.3gpp.org/ftp/Meetings_3GPP_SYNC/RAN4/Docs/ [retrieved on Aug. 20, 2017]* Paragraphs 2 and 3 *.

International Search Report—PCT/CN2018/101223—issued May 8, 2019.

* cited by examiner

METHODS, DEVICES AND COMPUTER READABLE MEDIUM FOR DETECTING CELLS IN SCENARIOS OF CARRIER AGGREGATION

FIELD

Embodiments of the present disclosure generally relate to communication techniques, and more particularly, to methods, devices and computer readable medium for detecting cells in scenarios of carrier aggregation.

BACKGROUND

Communication technologies are developing rapidly. The $3^{rd}$ generation partner project (3GPP) is now working on next generation radio, i.e., new radio (NR) communication system. One important aspect of the NR communication system is that the NR communication system supports carrier aggregation and dual connectivity. Carrier aggregation and dual connectivity are a very efficient way to increase downlink capacities such that when needed the system can assign additional downlink resources to the by aggregating resources from multiple downlink carriers.

SUMMARY

Generally, embodiments of the present disclosure relate to a method for a detecting cell in scenarios of carrier aggregation and dual connectivity.

In a first aspect, embodiments of the disclosure provide a terminal device. The terminal device comprises: at least one processor; at least one memory including computer program codes; the at least one memory and the computer program codes are configured to, with the at least one processor, cause the terminal device at least to receive, from a first cell connected to the terminal device, information indicating to connect to a second cell. The second cell is aggregated with the first cell. The terminal device is further caused to determine a receiver (Rx) beam on which the information is received from the first cell to the terminal device. The terminal device is also caused to detect a reference signal transmitted from the second cell on a spatial direction of the Rx beam, in response to determining that the second cell is unknown. The terminal device is yet caused to connect to the second cell.

In a second aspect, embodiments of the present disclosure provide a method for communication. The method comprises receiving, from a first cell connected to a terminal device, information indicating to connect to a second cell. The second cell being aggregated with the first cell. The method also comprises determining a receiver (Rx) beam on which the information is received from the first cell to the terminal device. The method further comprises detecting a reference signal transmitted from the second cell on a spatial direction of the Rx beam, in response to determining that the second cell is unknown. The method comprises connecting the terminal device to the second cell.

In a third aspect, embodiments of the disclosure provide an apparatus for communication. The apparatus comprises means for receiving, from a first cell connected to a terminal device, information indicating to connect to a second cell. The second cell is aggregated with the first cell. The apparatus also comprises means for determining a receiver (Rx) beam on which the information is received from the first cell to the device. The apparatus further comprises means for detecting a reference signal transmitted from the second cell on a spatial direction of the Rx beam in response to determining that the second cell is unknown. The apparatus also comprises means for connecting the device to the second cell.

In a fourth aspect, embodiments of the disclosure provide a computer readable medium. The non-transitory computer-readable medium stores instructions for causing an apparatus to perform receiving, from a first cell connected to a terminal device, information indicating to connect to a second cell. The second cell is aggregated with the first cell. The apparatus is also caused to perform determining a receiver (Rx) beam on which the information is received from the first cell to the device. The apparatus is further caused to perform in response to determining, based on the information, that the second cell is unknown, detecting a reference signal transmitted from the second cell on a spatial direction of the Rx beam. The apparatus is also caused to perform connecting the device to the second cell.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
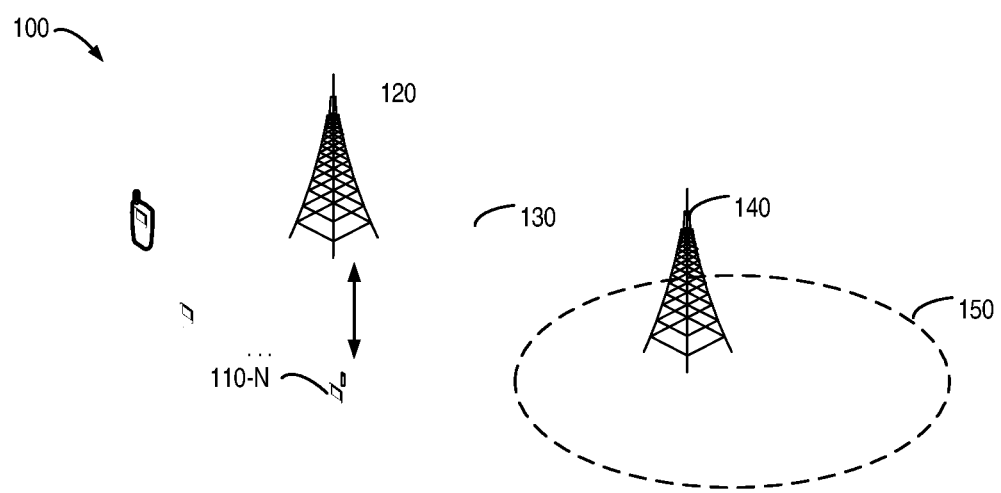
FIG. 1 illustrates a schematic diagram of a communication system according to embodiments of the present disclosure.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

The term "device" used herein refers to any proper devices which can communicate. For example, the term "device" may refer to a network device or a terminal device. The term "network device" includes, but not limited to, a base station (BS), a gateway, a management entity, and other suitable device in a communication system. The term "base station" or "BS" represents a node B (NodeB or NB), an evolved NodeB (eNodeB or eNB), a NR NodeB (gNB), a Remote Radio Unit (RRU), a radio header (RH), a remote radio head (RRH), a relay, a low power node such as a femto, a pico, and so forth.

The term "terminal device" includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "known cell" used herein refers to a cell that has been detected, measured and reported by a terminal device. The term "unknown cell" used herein refers to a cell that has or has not been detected, measured and/or reported by a terminal device.

The term "beamforming" used herein refers to a signal processing technique used in sensor arrays for directional signal transmission or reception. Beamforming can be used at both the transmitting and receiving ends in order to achieve spatial selectivity.

The term "measurement gap" used herein refers to a gap during which no transmission and reception happens. Since there is no signal transmission and reception during the gap, the terminal device can switch to the target cell and perform the signal quality measurement and come back to the current cell.

The term "circuitry" used herein may refer to one or more or all of the following:
(a) hardware-only circuit implementations (such as implementations in only analog and/or digital circuitry) and
(b) combinations of hardware circuits and software, such as (as applicable):
  (i) a combination of analog and/or digital hardware circuit (s) with
     software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As described above, the carrier aggregation is an important feature for the NR communication system. In the scenario of carrier aggregation, the terminal device usually connects with a primary cell and one or more secondary cell. The terminal device usually supports receiving beam forming. Besides, there are two different frequency ranges, i.e., FR1 and FR2. The FR1 usually refers to the frequency below 6 GHz and the FR2 refers to the frequency above 6 GHz. The terminal device may behave differently in different frequency ranges. There are two main types of carrier aggregations, Carrier Argentation (CA) and Dual-Connectivity (DC). The dual-connectivity may be applied among macro cells and micro cells.

For example, in FR2, the terminal device is assumed to use UE Rx beam forming. That is to say, the terminal device needs to support Rx beam forming. The number of Rx beams that the terminal device may be left for implementation of the terminal device. However, the latency requirements of the terminal device may be based on the number of Rx beams that the terminal device uses. For example, the number may be 2, 4, 8 or more.

Currently, the terminal device can only use one Rx beam for receiving at any time. That is to say, if the terminal device needs to perform measurements covering an approximate 360 spherical coverage, the terminal device has to switch Rx beams. During the switch of the Rx beam, the terminal device cannot receive, transmit or measure in other directions except the active Rx beam. Therefore, it is necessary to include an Rx beam relaxation e.g. in cell detection and measurement latencies of the terminal device to allow for the Rx beam switching When discussing CA and DC, same Rx beam restrictions of the terminal devices are applied and the terminal device can only receive with one active Rx beam at any time. That is to say, for data transmission, the terminal device may also only receive and transmit using one Rx beam.

For FR1 where omnidirectional Rx UE is assumed, it is open whether Rx beam scaling factor is needed. In conventional technologies, for FR2, the scaling factor is need, which increases latency of the terminal device. For example, in the current RAN meeting, the scaling factors N1 and N3 are introduced. In particular, Table 1 shows time periods for detecting a primary synchronization signal (PSS) and/or a secondary synchronization signal (SSS) on FR2 and Table 2 shows measurement periods for intra-frequency measurements without gaps on FR2.

TABLE 1

| DRX cycle | $T_{PSS/SSS\_sync\_intra}$ |
|---|---|
| No DRX | max[ 600 ms, ceil( [5] * $K_p$ * $K_{RLM}$) * $N_1$ * SMTC period ]$^{Note\ 1}$ |
| DRX cycle ≤320 ms | max[ 600 ms, ceil(1.5 * [5] * $K_p$ * $K_{RLM}$) $N_1$ * max(SMTC period, DRX cycle) ] |
| DRX cycle >320 ms | Ceil( [5] × $K_p$ * $K_{RLM}$) * $N_1$ * DRX cycle |
| ... | ... |

NOTE 1
If different SMTC periodicities are configured for different cells, the SMTC period in the requirement is the one used by the cell being identified

TABLE 2

| DRX cycle | $T_{SSB\_measurement\_period\_intra}$ |
|---|---|
| No DRX | max[ 400 ms, ceil( 5 * $K_p$* $K_{RLM}$) * $N_3$ * SMTC period ]$^{Note\ 1}$ |
| DRX cycle ≤320 ms | max[ 400 ms, ceil(1.5 * 5 * $K_p$* $K_{RLM}$) * $N_3$ * max(SMTC period, DRX cycle) ] |
| DRX cycle >320 ms | ceil(5 *$K_p$ * $K_{RLM}$ ) * $N_3$ * DRX cycle |

NOTE 1
If different SMTC periodicities are configured for different cells, the SMTC period in the requirement is the one used by the cell being identified Where DRX is short for "discontinuous reception" and SMTC is short for "SSB measurement timing configuration."

Further, RAN4 has agreed the requirement on NR SCell activation delay as below:

Tactivation_time is the SCell activation delay. If the SCell is known and belongs to FR1, Tactivation_time is:
  [3 ms+1*SMTC periodicity+2 ms], if the SCell measurement cycle is equal to or smaller than [160 ms].
  [3 ms+2*SMTC periodicity+2 ms], if the SCell measurement cycle is larger than [160 ms].
  If the SCell is unknown and belongs to FR1, Tactivation_time is:
  [3 ms+4*SMTC periodicity+2 ms] provided the SCell can be successfully detected on the first attempt.
  If the SCell being activated belongs to FR2, and there is at least one active serving cell on that FR2 band, then Tactivation_time is [3 ms+a certain value],
  If the SCell being activated belongs to FR2, and there is no active serving cell on that FR2 band, then, Tactivation_time is [3 ms+a certain vaule+2 ms].

The SCell activation time in FR2 is still open. Similar to the time in FR1, this needs to include time for MAC-CE message decode and application, AGC settling, search and timing refinement if needed.

3 ms is the time needed by the terminal device for MAC-CE message decode and application (software (SW) program both baseband and RF). For the terminal device, the procedure for MAC-CE message decode and SW program for baseband and RF should be no difference in FR1 and FR2.

In case there already exists at least one active cell on that FR2 band, the terminal device can re-use the timing information from that cell. it should not need any more extra time for search or timing refinement.

For FR2 and Rx beam forming, the terminal device does need to spend time on searching for or measuring a cell in case of unknown SCell. Currently this means using any Rx beam to ensure full spatial coverage including the Rx beam currently used for data reception and/or transmission. But since the UE can only receive and transmit using one Rx beam at a time (and on all CCs), the searching measuring using other Rx beams does not provide useful information. Further, it is very costly if the terminal device periodically performs inter-frequency measurements and deactivated measurements active.

In order to at least in part solve above and other potential problems, embodiments of the present disclosure provide a solution for detecting cells in scenarios of carrier aggregation. Example embodiments of the present disclosure are described below with reference to the figures. However, those skilled in the art would readily appreciate that the detailed description given herein with respect to these figures is for explanatory purpose as the present disclosure extends beyond theses limited embodiments.

FIG. 1 illustrates a schematic diagram of a communication system in which embodiments of the present disclosure can be implemented. The communication system 100, which is a part of a communication network, includes network devices 120 and 140, and terminal devices 110-1, 110-2, . . . , and 110-N (where N is an integer number). It is to be understood that the communication system 100 may include any suitable number of terminal devices. It should be noted that the communication system 100 may also include other elements which are omitted for the purpose of clarity. The communication system 100 may have the CA configuration. The communication system 100 may also be a dual-connectivity system. The communication system may support any suitable technologies of carrier augmentations.

As shown in FIG. 1, the network device 120 is within the first cell 130 and the network device 140 is within the second cell 150. It should be noted that there may be other network devices in the first cell 130 and the second cell 150. The first cell 130 and the second cell 150 are aggregated. The first cell 130 may be a primary cell (PCell), a primary secondary cell (PSCell) or a secondary cell (SCell). The second cell 150 may be a PSCell or a SCell. Only for the purpose of illustrations, FIG. 1 shows that the terminal devices 120 are currently connecting with the first cell 130.

Communications in the communication system 100 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

According to embodiments of the present disclosure, if the terminal device receives information indicating to connect using aggregation to a cell from the currently connecting cell, the terminal device detects the cell to be aggregated in a spatial direction of the beam on which the information is received. In this way, a significant reduction in terminal device search and measurement effort is achieved, which leads to significant reduction in the latency and UE power consumption.

Figure 2:
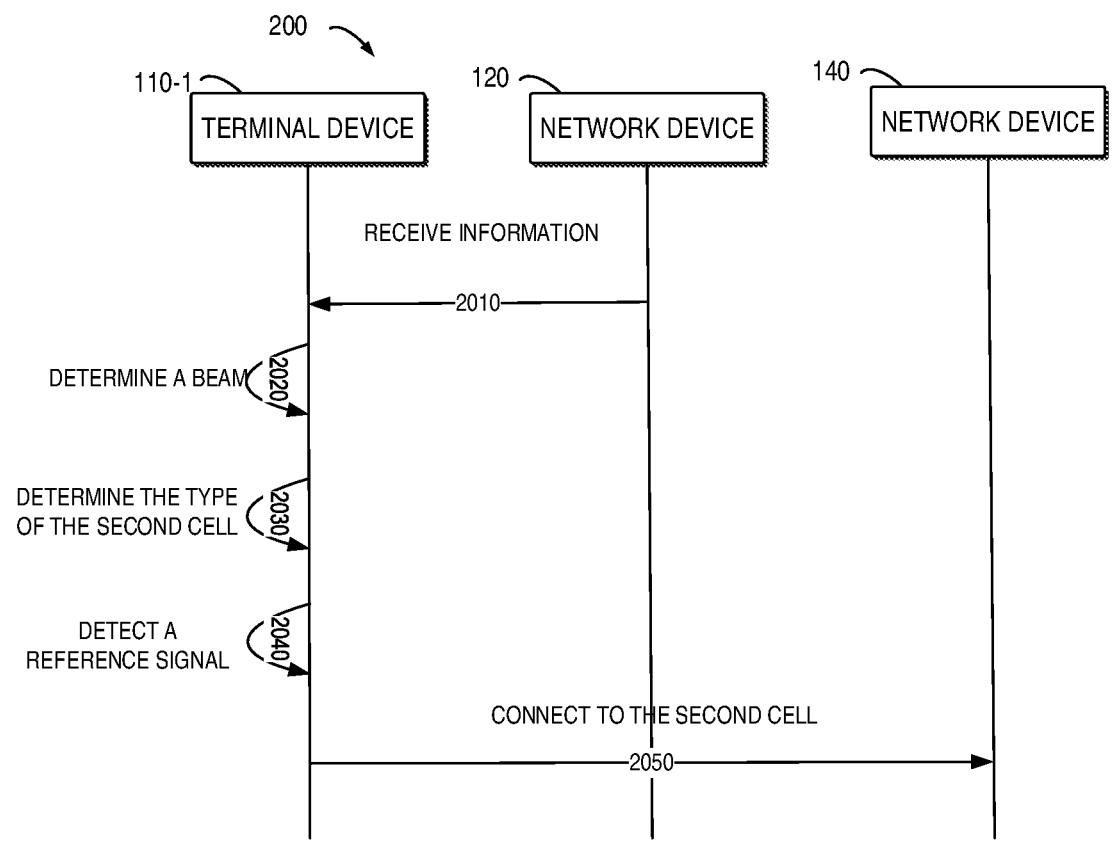
FIG. 2 illustrates a schematic diagram of interaction operations among devices according to embodiments of the present disclosure.

FIG. 2 illustrates a schematic diagram of example interaction operations 200 among devices according to embodiments of the present disclosure. In some embodiments, the first cell 130 and the second cell 150 may be collocated with each other, which means they may have the same channel conditions. Only for the purpose of illustrations, the interaction operation 300 is described to be implemented among the terminal device 110-1, the network device 120 in the first cell 130 and the network device 140 in the second cell 150. It should be noted that the interaction operation 200 may be implemented among any other proper devices. Embodiments of the present disclosure are not limited in this aspect. In some embodiments, the configurations of cells may be accessible to the terminal device 110-1. For example, the cell configurations may be transmitted to the terminal device 110-1 from a PCell. The cell configurations may also be stored in a local/remote storage that the terminal device 110-1 can access. The cell configurations may include configurations for PCell, configurations for SCell, or configurations for PSCell.

The network device 120 in the first cell 130 transmits 2010 information to the terminal device 110-1. The information indicates the terminal device 110-1 to connect using carrier aggregation to a secondary cell (for example, the second cell 150). In some embodiments, the information may comprise an activation signal of the secondary cell. The activation signal may be transmitted via medium access control (MAC) signaling. Alternatively or in addition, the information may comprise PSCell configurations. The PSCell configurations may be transmitted via radio resource control (RRC) signaling.

The terminal device 110-1 determines 2020 a beam on which the information is transmitted and received from the first cell 130 to the terminal device 110-1. For example, the information is transmitted in the downlink beam and received by the UE using a given UE Rx beam. Thus, the terminal device 110-1 is able to determine the Rx beam.

The terminal device 110-2 determines 2030 the type of the second cell 150. The terminal device 110-2 may determine the second cell is a known cell or unknown. As stated above, the known cell means that the cell has been detected, measured and reported.

If the second cell 150 is unknown, the terminal device 110-1 detect 2040 a reference signal on the cell by using only a spatial direction of the determined UE Rx beam. In this way, the time for the terminal device 110-1 to search the second cell 150 is significantly reduced, which decreases latencies of the terminal device 110-1. The terminal device 110-1 connects 2050 to the second cell 150.

The reference signal may, for example, be carried in a synchronization signal block (SSB). For example, the reference signal may be a primary synchronization signal (PSS). Alternatively, or in addition, the reference signal may be a secondary synchronization signal (SSS). In other embodiments, the refence signal may be transmitted over a physical broadcast channel (PBCH).

In some embodiments, the terminal device 110-1 may decode the reference signal and obtain the physical cell identity of the second cell. The SCell configuration includes a physical cell identity. The terminal device 110-1 may compare the physical cell identity of the activated cell with the detected physical cell identity, which will be matched.

Figure 3:
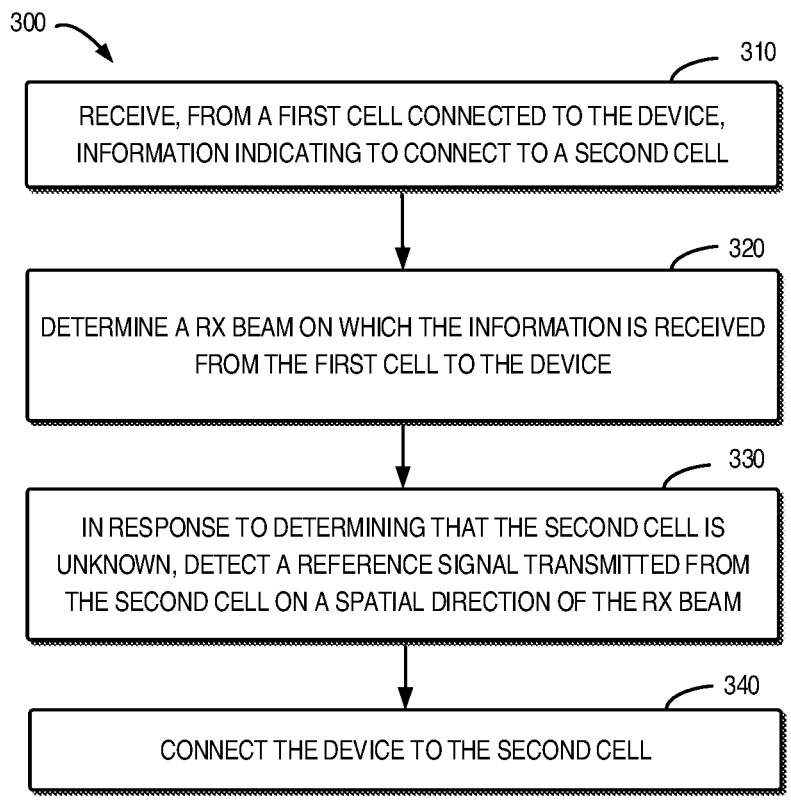
FIG. 3 illustrates a flow chart of a method implemented at a terminal device according to embodiments of the present disclosure.

FIG. 3 illustrates a flow chart of a method 300 according to embodiments of the present disclosure. The method 300 may be implemented at the terminal device 110-1.

At block 310, the terminal device 110-1 receives information to the second cell 150 from the first cell 130 connected to the terminal device 110-1. The information indicates the terminal device 110-1 to connect a primary secondary cell or a secondary cell (for example, the second cell 150). In some embodiments, the information may comprise an activation signal of the secondary cell. The activation signal may be transmitted via medium access control (MAC) signaling. Alternatively, or in addition, the information may comprise PSCell configurations. The PSCell configurations may be transmitted via radio resource control (RRC) signaling.

Only as an example, the terminal device 110-1 may receive the information in time slot n and the secondary cell 150 is an SCell. The terminal device 110-1 shall be capable to transmit valid channel signaling indication (CSI) report and apply action related to the information no later than in slot n+[$T_{HARQ}$+$T_{activation\_time}$+$T_{CSI\_Reporting}$], where $T_{HARQ}$ is the timing between downlink data transmission and acknowledgment, $T_{activation\_time}$ is the SCell activation delay and T is the delay uncertainty in acquiring the first available CSI reporting resources.

At block 320, the terminal device 110-1 determines the UE Rx beam on which the information is received from the first cell 130 to the terminal device 110-1. For example, the information is transmitted in the downlink beam and received using a given Rx beam. Thus, the terminal device 110-1 is able to determine the Rx beam.

At block 330, the terminal device 110-1 detects a reference signal transmitted from the second cell 150 on the same spatial direction of the Rx beam if the terminal device 110-1 determines that the second cell 150 is unknown based on the information.

For example, SCell is known if it has been meeting the following conditions:
During the period equal to max ([5] measCycleSCell, [5] DRX cycles) before the reception of the SCell activation command:
the terminal device 110-1 has sent a valid measurement report for the SCell being activated and
the SSB measured remains detectable according to the cell identification conditions.

The SSB measured during the period equal to max ([5] measCycleSCell, [5] DRX cycles) also remains detectable during the SCell activation delay according to the cell identification conditions.

Otherwise SCell is unknown.

If the second cell 150 is unknown, the terminal device 110-1 detects 2040 a reference signal on a spatial direction of the determined Rx beam. In this way, the time for the terminal device 110-1 to search the second cell 150 is significantly reduced, which decreases latencies of the terminal device 110-1 and reduces UE power consumption.

The reference signal may, for example, be carried in a synchronization signal block (SSB). For example, the reference signal may be a primary synchronization signal (PSS). Alternatively or in addition, the reference signal may be a secondary synchronization signal (SSS). In other embodiments, the refence signal may be transmitted over a physical broadcast channel (PBCH).

In some embodiments, the terminal device 110-1 may decode the reference signal and obtain the physical cell identity of the second cell. The SCell configuration includes a physical cell identity. The terminal device 110-1 may compare the physical cell identity of the activated cell with the detected physical cell identity, which will be matched.

At block 340, the terminal device 110-1 connects to the second cell 150. In some embodiments, in addition to CSI reporting defined above, the terminal device 110-1 shall also apply other actions related to the information (for example, activation command in the information) for an SCG SCell at the first opportunities for the corresponding actions once the SCell is activated.

The PSCell interruption shall not occur before slot n+[$T_{HARQ}$] and not occur after slot n+[$T_{HARQ}$+3 ms]. Starting from the slot (timing for secondary Cell activation/deactivation) and until the terminal device 110-1 has completed the SCell activation, the terminal device 110-1 shall report out of range if the UE has available uplink resources to report CQI for the SCell.

In an example embodiment, as stated above, if the terminal device 110-1 may receive the information in time slot n, the terminal device 110-1 shall be capable to transmit valid channel signaling indication (CSI) report and apply action related to the information no later than in slot n+ [$T_{HARQ}$+$T_{activation\_time}$+$T_{CSI\_Reporting}$]. Since the terminal device 110-1 only need to detect the determined beam instead of sweeping all of the beams, if the Cell is unknown and belongs to FR2, $T_{activation\_time}$ is [3 ms+4*SMTC periodicity+2 ms]. The value of $T_{activation\_time}$ is reduced, which means the latencies are reduced.

In some embodiments, an apparatus for performing the method 300 (for example, the first device 210-1) may comprise respective means for performing the corresponding steps in the method 300. These means may be implemented in any suitable manners. For example, it can be implemented by circuitry or software modules.

In some embodiments, the apparatus comprises means for receiving, from a first cell connected to a terminal device, information indicating to connect to a second cell. The second cell is aggregated with the first cell. The apparatus also comprises means for determining a Rx beam on which the information is transmitted from the first cell to the terminal device. The apparatus further comprises in response to determining, based on the information, that the second cell is unknown means for detecting a reference signal transmitted from the second cell on a spatial direction of the same Rx beam. The apparatus also comprises means for connecting the terminal device to the second cell.

In some embodiments, the information is transmitted on radio resource control (RRC) signaling.

In some embodiments, the information is transmitted on medium access control (MAC) signaling.

In some embodiments, the reference signal is selected from a group consisting of a primary synchronization signal (PSS), a secondary synchronization signal (SSS), and a signal on a physical broadcast channel (PBCH).

In some embodiments, the first cell is a primary cell (PCell) or a primary secondary cell (PSCell), and the second cell is a PSCell or a secondary cell (SCell).

In some embodiments, an operating frequency of the second cell is above 6 GHz.

In some embodiments, the first and second cells are in a carrier aggregation configuration In some embodiments, the first and second cells are in a dual-connectivity configuration.

Figure 4:
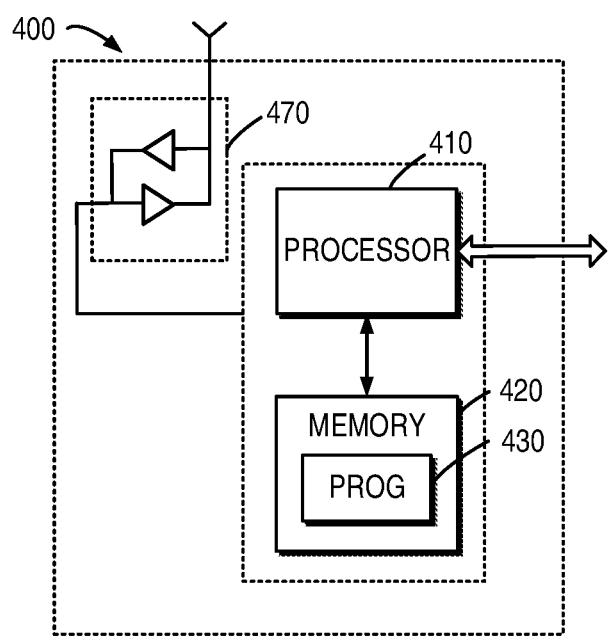
FIG. 4 illustrates a schematic diagram of a device according to embodiments of the present disclosure.

FIG. 4 is a simplified block diagram of a device 400 that is suitable for implementing embodiments of the present disclosure. The device 400 may be implemented at the device 110. As shown, the device 400 includes one or more processors 410, one or more memories 420 coupled to the processor(s) 410, one or more transmitters and/or receivers (TX/RX) 440 coupled to the processor 410.

The processor 410 may be of any type suitable to the local technical network, and may include one or more of general purpose computers, special purpose computers, microprocessors, digital signal processors (DSPs) and processors based on multicore processor architecture, as non-limiting examples. The device 400 may have multiple processors, such as an application specific integrated circuit chip that is slaved in time to a clock which synchronizes the main processor.

The memory 420 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 420 stores at least a part of a program 430. The TX/RX 440 is for bidirectional communications. The TX/RX 440 has at least one antenna to facilitate communication, though in practice an Access Node mentioned in this application may have several ones. The communication interface may represent any interface that is necessary for communication with other network elements.

The program 430 is assumed to include program instructions that, when executed by the associated processor 410, enable the device 400 to operate in accordance with the embodiments of the present disclosure, as discussed herein with reference to FIGS. 2 and 3. That is, embodiments of the present disclosure can be implemented by computer software executable by the processor 410 of the device 400, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A terminal device, comprising:
   at least one processor; and
   at least one memory including computer program codes;
   the at least one memory and the computer program codes are configured to, with the at least one processor, cause the terminal device at least to:
   receive, from a first cell connected to the terminal device, an activation signal to activate a second cell, the second cell being aggregated with the first cell, and the first cell and the second cell belonging to a frequency range 2 (FR2);
   determine whether the second cell is known or unknown; and
   in response to determining that the second cell is unknown, detect a reference signal transmitted from the second cell by using a spatial receiver (Rx) beamforming of an Rx beam which has been received from the first cell.

2. The terminal device of claim 1, wherein the activation signal is transmitted on radio resource control (RRC) signaling.

3. The terminal device of claim 1, wherein the activation signal is transmitted on medium access control (MAC) signaling.

4. The terminal device of claim 1, wherein the reference signal is selected from a group consisting of a primary synchronization signal (PSS), a secondary synchronization signal (SSS), and a signal on a physical broadcast channel (PBCH).

5. The terminal device of claim 1, wherein the first cell is a primary cell (PCell) or a primary secondary cell (PSCell), and the second cell is a PSCell or a secondary cell (SCell).

6. The terminal device of claim 1, wherein an operating frequency of the second cell is above 6 GHz.

7. The terminal device of claim 1, wherein the first and second cells are in a carrier aggregation configuration.

8. The terminal device of claim 1, wherein the first and second cells have same channel conditions.

9. A communication method, comprising:
   receiving, from a first cell connected to a terminal device, an activation signal to a second cell, the second cell being aggregated with the first cell, and the first cell and the second cell belonging to a frequency range 2 (FR2);
   determining whether the second cell is known or unknown;
   in response to determining that the second cell is unknown, detecting a reference signal transmitted from the second cell by using a spatial receiver (Rx) beamforming of an Rx beam which has been received from the first cell.

10. The method of claim 9, wherein the activation signal is transmitted on radio resource control (RRC) signaling.

11. The method of claim 9, wherein the activation signal is transmitted on medium access control (MAC) signaling.

12. The method of claim 9, wherein the reference signal is selected from a group consisting of a primary synchronization signal (PSS), a secondary synchronization signal (SSS), and a signal on a physical broadcast channel (PBCH).

13. The method of claim 9, wherein the first cell is a primary cell (PCell) or a primary secondary cell (PSCell), and the second cell is a PSCell or a secondary cell (SCell).

14. The method of claim 9, wherein an operating frequency of the second cell is above 6 GHz.

15. The method of claim 9, wherein the first and second cells are in a carrier aggregation configuration.

16. The method of claim 9, wherein the first and second cells have same channel conditions.

17. A non-transitory computer readable medium storing instructions for causing a terminal device to perform at least the following:
   receiving, from a first cell connected to the terminal device, an activation signal to activate to a second cell, the second cell being aggregated with the first cell, and the first cell and the second cell belonging to a frequency range 2 (FR2);
   determining whether the second cell is known or unknown; and
   in response to determining that the second cell is unknown, detecting a reference signal transmitted from the second cell by using a spatial Rx beamforming of an Rx beam which has been received from the first cell.

18. The non-transitory computer readable medium of claim 17, wherein the activation signal is transmitted on medium access control (MAC) signaling.

19. The non-transitory computer readable medium of claim 17, wherein the reference signal is selected from a group consisting of a primary synchronization signal (PSS), a secondary synchronization signal (SSS), and a signal on a physical broadcast channel (PBCH).

20. The non-transitory computer readable medium of claim 17, wherein the first cell is a primary cell (PCell) or a primary secondary cell (PSCell), and the second cell is a PSCell or a secondary cell (SCell).

* * * * *